United States Patent
Tanabe et al.

(10) Patent No.: US 10,202,036 B2
(45) Date of Patent: Feb. 12, 2019

(54) FUEL TANK AND FUEL TANK MOUNTING STRUCTURE

(71) Applicant: TOYOTA JIDOSHA KABUSHIKI KAISHA, Toyata-shi, Aichi-ken (JP)

(72) Inventors: Daisuke Tanabe, Nisshin (JP); Shuichi Aso, Toyota (JP); Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 15/025,122

(22) PCT Filed: Sep. 25, 2014

(86) PCT No.: PCT/IB2014/002145
§ 371 (c)(1),
(2) Date: Mar. 25, 2016

(87) PCT Pub. No.: WO2015/044775
PCT Pub. Date: Apr. 2, 2015

(65) Prior Publication Data
US 2016/0257195 A1    Sep. 8, 2016

(30) Foreign Application Priority Data
Sep. 25, 2013    (JP) ................. 2013-198542

(51) Int. Cl.
*B60K 15/03*      (2006.01)
*B60K 15/07*      (2006.01)
(Continued)

(52) U.S. Cl.
CPC ........ *B60K 15/07* (2013.01); *B60K 15/03177* (2013.01); *B60K 15/067* (2013.01); *B60K 2015/0634* (2013.01)

(58) Field of Classification Search
CPC .... B60K 2015/0775; B60K 2015/0777; B60K 2015/0344; B60K 2015/03453;
(Continued)

(56) References Cited

U.S. PATENT DOCUMENTS

| 6,408,979 B1* | 6/2002 | Forbes | G10K 11/16 181/198 |
| 2009/0189384 A1* | 7/2009 | Schoen | B60K 15/03 280/834 |

(Continued)

FOREIGN PATENT DOCUMENTS

| DE | 10 2009 031 441 A1 | 1/2011 |
| JP | H11-165544 A | 6/1999 |

(Continued)

OTHER PUBLICATIONS

Apr. 5, 2016 Office Action issued in Japanese Patent Application No. 2013-198542.

*Primary Examiner* — Andrew T Kirsch
(74) *Attorney, Agent, or Firm* — Oliff PLC (57) ABSTRACT

In a fuel tank, high-rigidity portions are formed to protrude to an inner side from a part of a wall portion inside the fuel tank, the wall portion defining a closed space. A built-in part is fixed to the high-rigidity portions, and is also fixed to the horizontal portion. Therefore, when the fuel tank is deformed, deformation of the high-rigidity portions is restrained, so displacement of the built-in part is restrained. As a result, deformation is restrained in the horizontal portion of the fuel tank fixed to the built-in part that is restrained from being displaced when the fuel tank is deformed.

6 Claims, 10 Drawing Sheets

(51) Int. Cl.
*B60K 15/063* (2006.01)
*B60K 15/067* (2006.01)

(58) Field of Classification Search
CPC ........... B60K 2015/00346; B60K 2015/03467; B60K 15/077; B60K 15/073
See application file for complete search history.

(56) References Cited

U.S. PATENT DOCUMENTS

| | | |
|---|---|---|
| 2012/0097318 A1 | 4/2012 | Thompson et al. |
| 2012/0161371 A1 | 6/2012 | Lichtenauer et al. |
| 2015/0217635 A1* | 8/2015 | Nakane ................... B29C 49/20 220/562 |

FOREIGN PATENT DOCUMENTS

| | | |
|---|---|---|
| JP | 2004-090756 A | 3/2004 |
| JP | 2004-358927 A | 12/2004 |
| JP | 2010-076526 A | 4/2010 |
| JP | 2010-274874 A | 12/2010 |
| JP | 2012-530013 A | 11/2012 |
| JP | 2012-531324 A | 12/2012 |
| KR | 2011-0098538 A | 9/2011 |
| WO | 02/39010 A2 | 5/2002 |
| WO | 2011/121655 A1 | 10/2011 |
| WO | 2012/075355 A1 | 6/2012 |

\* cited by examiner

FUEL TANK AND FUEL TANK MOUNTING STRUCTURE

BACKGROUND OF THE INVENTION

1. Field of the Invention

The invention relates to a fuel tank mounted on a vehicle, and a fuel tank mounting structure.

2. Description of Related Art

A fuel tank made of a resin (herein below, referred to as a resin fuel tank) is used as a fuel tank for an automobile.

However, a resin fuel tank is easily deformed in association with changes in outdoor air temperature. Therefore, there has been a possibility that durability of a fuel tank is deteriorated due to repeated deformation. Deformation of a fuel tank could also cause displacement of a built-in part, which could interfere with fuel supply when negative pressure is applied.

Therefore, means for restraining deformation is provided in a resin fuel tank. For example, Japanese Patent Application Publication No. 2012-530013 (JP 2012-530013 A) proposes that a reinforcing member is provided outside a fuel tank so as to restrain deformation of the resin fuel tank.

However, when a reinforcing member is provided outside a fuel tank to restrain deformation of the resin fuel tank like the technology described in JP 2012-530013 A, a large space is required for installing a fuel tank, which creates a possibility of lowering a degree of freedom in designing a vehicle.

SUMMARY OF THE INVENTION

The invention provides a fuel tank and a fuel tank mounting structure, in which deformation is restrained without increasing an installation space.

According to an aspect of the invention, a fuel tank includes a flat surface portion being a part of a wall portion, the wall portion defining a closed space in which fuel is housed, a high-rigidity portion, which is formed to protrude to an inner side or an outer side of the closed space from the flat surface portion, or is a corner portion made by a plurality of the flat surface portions, and a built-in part being housed in the closed space, is abutted on at least two of the high-rigidity portions, the built-in part being fixed at at least one point in the flat surface portion.

Since the high-rigidity portion being a part of the fuel tank is formed to protrude to the inner side or the outer side from the flat surface portion or is a corner portion made by a plurality of flat surface portions, the high-rigidity portion has higher rigidity than that of the flat surface portion. The built-in part is abutted on at least two high-rigidity portions having higher rigidity than that of the flat surface portion, and is fixed at at least one point in the flat surface portion. In this case, even when the outside temperature is changed and the fuel tank is deformed, deformation of the high-rigidity portion with higher rigidity than that of the flat surface portion is restrained. Therefore, in the built-in part, which is abutted on at least two high-rigidity portions, changes in location and position are restrained when the fuel tank is deformed. As a result, deformation is restrained in the flat surface portion of the fuel tank fixed to at least one point of the built-in part that is restrained from being displaced. Here, "abutment" includes both placing the built-in part on the high-rigidity portion and fixing the built-in part to the high-rigidity portion.

In the fuel tank, the high-rigidity portion may be formed to protrude to the inner side of the closed space from the flat surface portion.

In the fuel tank, the high-rigidity portion may be a recessed groove provided in the flat surface portion, the recessed groove arranging a tank band the fuel tank is held on a vehicle by the tank band.

In the fuel tank, the built-in part is abutted on portions where the recessed grooves for arranging the tank bands are formed, in other words, on at least two high-rigidity portions, which are projecting portions that protrude from the flat surface portion towards the closed space of the fuel tank. Therefore, the fuel tank is mounted on a vehicle body, the high-rigidity portions are supported by the tank bands, thereby increasing rigidity of the high-rigidity portions even further. As a result, changes in location and position of the built-in part are restrained even more when the fuel tank is deformed, and deformation of the flat surface portion of the fuel tank is restrained even further.

In the fuel tank, the high-rigidity portion is provided in a bottom wall on a lower side of the fuel tank in a vehicle up and down direction.

The high-rigidity portion is provided in the bottom wall on the lower side of the fuel tank in the vehicle up and down direction. Therefore, when the built-in part is abutted on the plurality of high-rigidity portions in the bottom wall of the fuel tank, and the built-in part is fixed to at least one point of the flat surface portion of the bottom wall, the bottom wall of the fuel tank, which is most likely to be deformed because of a weight of fuel, is restrained from being deformed.

In the fuel tank, the high-rigidity portion may be the corner portion made by the plurality of flat surface portions.

In the fuel tank, the built-in part may be fixed to the flat surface portion at at least one point on an outer side of a location, the location being between the high-rigidity portions.

In the fuel tank, the built-in part may be fixed to the high-rigidity portion by swaging.

In a fuel tank mounting structure, the fuel tank is mounted on a vehicle, an upper wall of the fuel tank on an upper side in the vehicle up and down direction is abutted on or arranged in proximity to an other member of the vehicle.

In the fuel tank mounting structure, the fuel tank is mounted on the vehicle, the other member of the vehicle is abutted on or arranged in proximity to the upper wall of the fuel tank on an upper side in the vehicle up and down direction. Therefore, when the fuel tank has expansion deformation due to an increase in outdoor air temperature and so on, the upper wall of the fuel tank abuts on the other part of the vehicle body from the beginning or during deformation, and deformation of the upper wall is restrained.

The fuel tank mounting structure is a fuel tank being mounted on a vehicle by the fuel tank mounting structure, and includes the fuel tank and a holding portion configured to hold the fuel tank at a position of the high-rigidity portion of the fuel tank and the configured to mount the fuel tank to a vehicle body.

In the fuel tank mounting structure, the holding portion holds the fuel tank and mounts the fuel tank on the vehicle body at a position of the high-rigidity portion provided in the fuel tank. Therefore, the high-rigidity portion having higher rigidity than that of the flat surface portion is held by the holding portion, and rigidity is even more increased. Accordingly, changes in location and position of the built-in part abutted on at least two high-rigidity portions are restrained even further when the fuel tank is deformed. As a result, deformation is restrained even further in the flat surface portion of the fuel tank that is fixed to at least one point of the built-in part that is restrained from being displaced.

In the fuel tank mounting structure, the holding portion is a tank band holding the fuel tank, and the high-rigidity portion is a recessed groove being defined to protrude from the flat surface portion to the inner side, the tank band being arranged in the recessed groove.

In the fuel tank mounting structure, the recessed groove, which is defined to protrude from the flat surface portion to the inner side for arranging the tank band, corresponds to the high-rigidity portion. Therefore, it is not necessary to form a new high-rigidity portion for the built-in part to be abutted on. By arranging the tank band On the recessed groove, the high-rigidity portion is supported by the tank band. Therefore, rigidity of the high-rigidity portion is increased even more. Thus, deformation of the fuel, tank is restrained even further.

Since the invention has the above-mentioned structure, it is possible to restrain deformation of the fuel tank without increasing an installation space.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
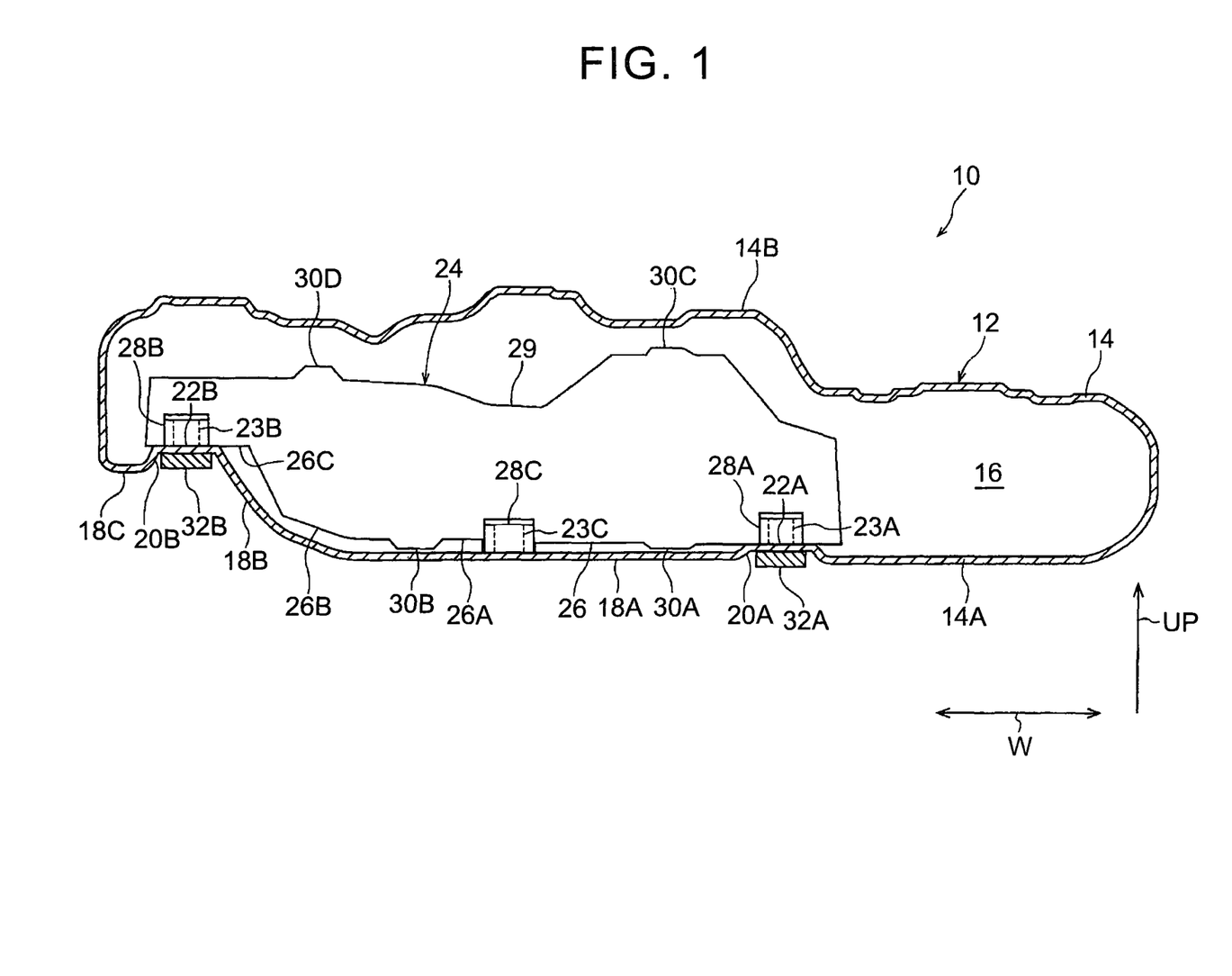
FIG. 1 is a vertical sectional view showing a fuel tank mounting structure according to a first embodiment of the invention.

[First Embodiment] A resin fuel tank and a mounting structure of the resin fuel tank according to a first embodiment of the invention are explained. FIG. 1 shows a vertical sectional view of a resin fuel tank mounting structure 10. Herein below, a vehicle width direction is shown by an arrow W, and an upper side of a vehicle is shown by an arrow UP in each drawing.

As shown in FIG. 1, a resin fuel tank (herein after, sometimes referred to as a "fuel tank") 12 has a generally rectangular shape, and defines a closed space 16, which houses fuel inside, with resin-made wall portion 14 having a constant thickness.

A portion of the wall portion 14, is a part of a bottom surface of the fuel tank 12, is a bottom wall 14A. The bottom wall 14A includes a horizontal portion 18A, which is a flat surface portion extending in a vehicle width direction W, an inclined portion 18B, which is a flat surface portion extending obliquely to an upper side in a vehicle up and down direction on a left end side of the horizontal portion 18A, and a horizontal portion 18C, which is a flat surface portion extending in the vehicle width direction W from a left end of the inclined portion 18B.

In the bottom wall 14A of the fuel tank 12, recessed grooves 20A, 20B extending in a vehicle front-rear direction (a direction perpendicular to the sheet surface in FIG. 1) are provided for arranging tank bands 32A, 32B described later. The recessed groove 20A is defined by protruding the wall portion 14 on the closed space 16 side (herein after, sometimes referred to "an inner side") from the horizontal portion 18A of the bottom wall 14A, and is structured as a high-rigidity portion 22A having higher rigidity than that of the surrounding horizontal portion 18A. The recessed groove 20B is also defined by protruding the wall portion 14 on the inners side on a right end side of the horizontal portion 18C, and is structured as a high-rigidity portion 22B having higher rigidity than that of the surrounding horizontal portion 18C.

On the closed space 16 side of the bottom wall 14A, fitted members 23A~23C for fixing a built-in part 24 described later are provided on upper surfaces of the high-rigidity portions 22A, 22B and at one location of the horizontal portion 18A between the high-rigidity portions 22A, 22B.

In the built-in part 24 arranged inside the closed space 16 of the fuel tank 12, a length in the vehicle width direction W is about two third of that of the fuel tank 12, and a thickness in a vehicle front-rear direction is smaller than that of the fuel tank 12. The built-in part 24 is arranged so as to support the wall portion 14 of the fuel tank 12 when the fuel tank 12 is deformed, and restrain deformation of the fuel tank 12, and so on. There are other members arranged inside the fuel tank 12. However, illustration of such members is omitted because they are not related to the main part of the invention.

A bottom portion 26 of the built-in part 24 has a shape similar to the bottom wall 14A of the fuel tank 12, and has a horizontal portion 26A extending in the vehicle width direction W, an inclined portion 26B extending obliquely to an upper side in the vehicle up and down direction from the left end of the horizontal portion 26A and a horizontal portion 26C extending in the vehicle width direction W from the left end of the inclined portion 26B.

In the built-in part 24, swaging portions 28A, 28B, 28C are provided on the bottom portion 26 side of the side surface of the built-in part 24 in order to fix the built-in part 24 to the fuel tank 12 by inserting the fitted members 23A~23C, which are provided in the bottom wall 14A of the fuel tank 12, into the swaging portions 28A, 28B, 28C and performing swaging.

In the bottom portion 26 of the built-in part 24, support portions 30A, 30B, which support the fuel tank 12 deformed due to negative pressure, are formed to project outwardly between the swaging portion 28A and the swaging portion 28C and between the swaging portion 28C and the swaging portion 28B, respectively, The support portions 30A, 30B are formed at positions on an upper side of the lower end of the swaging portion 28C in the vehicle up and down direction so that the support portions 30A, 30B do not interfere with the bottom wall 14A of the fuel tank 12 when the built-in part 24 is fixed to the fuel tank 12.

Similarly, support portions 30C, 30D are formed to protrude outwardly in an upper portion 29 of the built-in part 24.

The built-in part 24 formed as above is fixed to the fuel tank 12 as the fitted members 23A~23C, which are provided in the high-rigidity portions 22A, 22B and the horizontal portion 18A of the fuel tank 12, are inserted to the swaging portions 28A~28C of the built-in part 24, respectively, and swaged. As a result, the built-in part 24 is fixed so that both ends of the built-in part 24 are supported by the high-rigidity portions 22A, 22B of the bottom wall 14A of the fuel tank 12, and is fixed at one point in the horizontal portion 18A between the high-rigidity portions 22A, 22B.

As described above, the fuel tank 12, to which the built-in part 24 is fixed inside, is fixed to a bottom surface of a vehicle by laying and tightening metallic tank bands 32A, 32B around along the recessed grooves 20A, 20B provided in the bottom wall 14A of the fuel tank 12.

Effects of the fuel tank 12 and the mounting structure 10 of the fuel tank 12 structured as above are explained with reference to FIG. 2 to FIG. 5. In FIG. 2 to FIG. 5, deformation is drawn with exaggeration in order to facilitate understanding of the effects.

Explained first is a case where positive pressure is applied to the fuel tank 12, such as when outside temperature is increased.

In order to explain effects of the embodiment, a case of a comparative example, in which a built-in part is not fixed to a horizontal portion 18A, is explained first.

Figure 2:
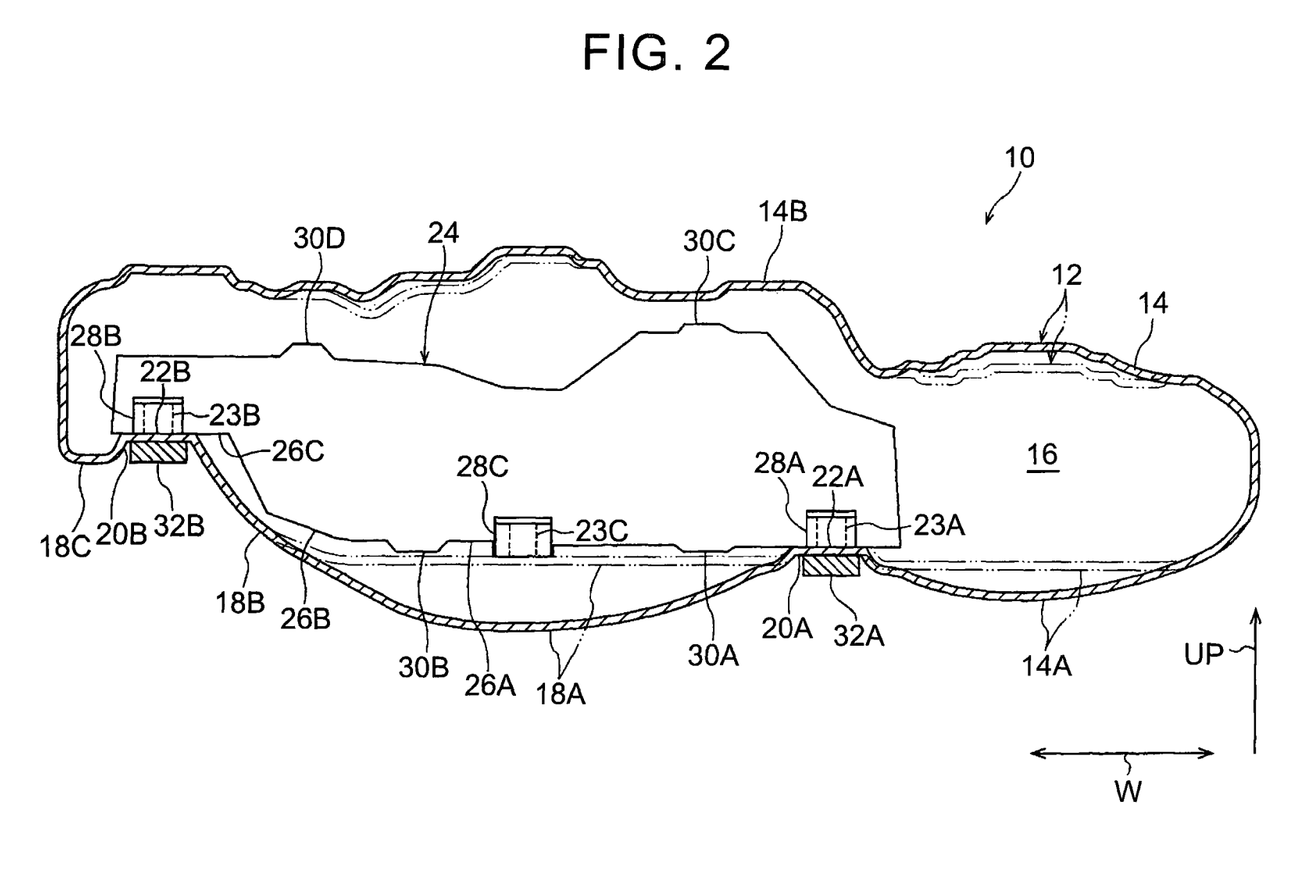
FIG. 2 is a vertical sectional view showing a deformed state of a fuel tank mounting structure (a resin fuel tank) according to a comparative example when positive pressure is applied.

As shown in FIG. 2, when positive pressure is applied to a fuel tank 12, the fuel tank 12 expands. In this case, deformation of high-rigidity portions 22A, 22B is restrained because the high-rigidity portions 22A, 22B have higher rigidity than that of the rest of the flat surface portion such as the horizontal portion 18A. However, the flat surface portion such as the horizontal portion 18A is deformed. In particular, a bottom wall 14A (the horizontal portion 18A) of the fuel tank 12 between the high-rigidity portions 22A, 22B (between tank bands 32A, 32B), on which weight of fuel acts, expands to a lower side in the vehicle up and down direction (chain double-dashed lines in the drawing show an initial shape of the fuel tank 12).

Figure 3:
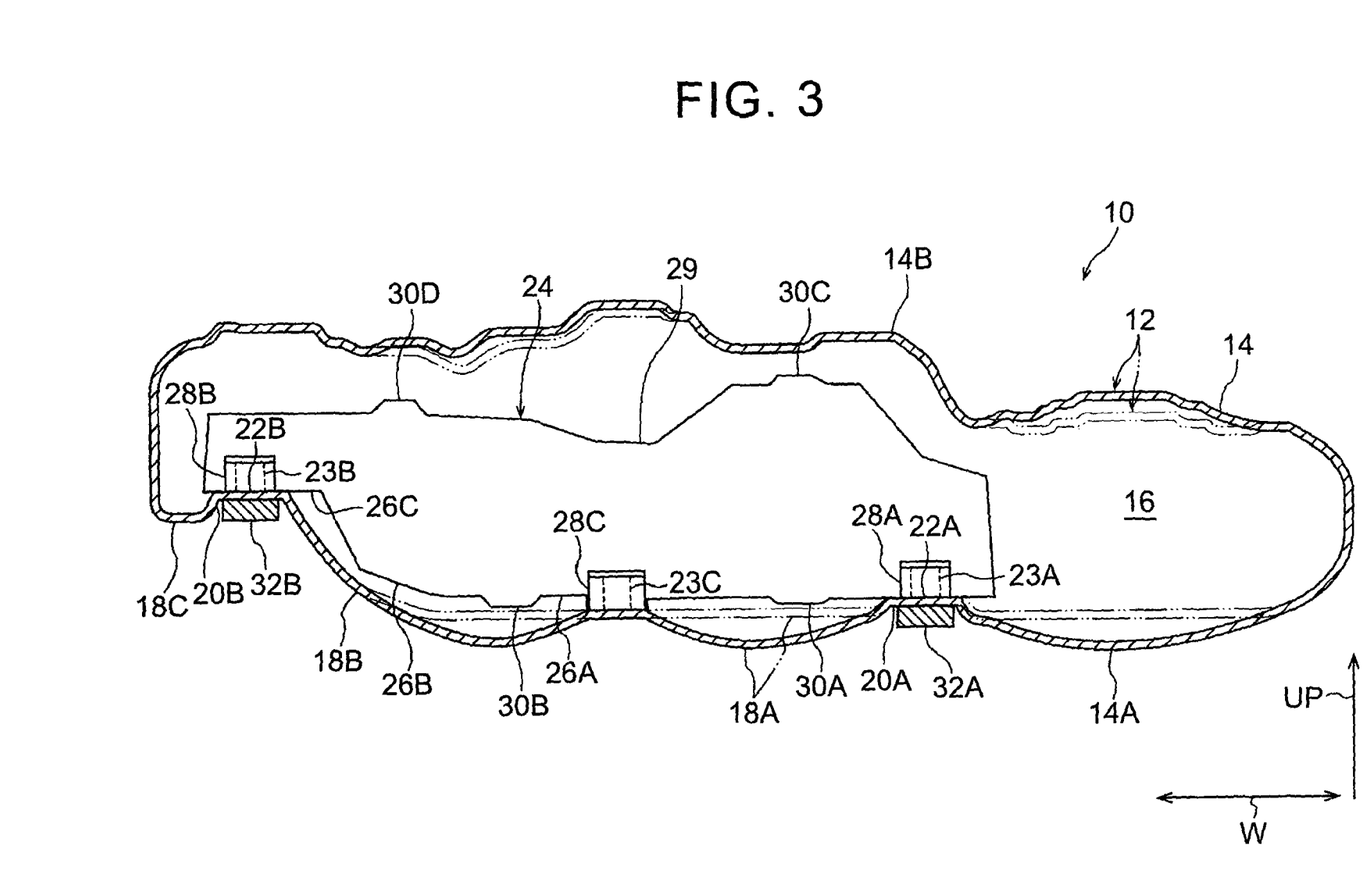
FIG. 3 is a vertical sectional view showing a deformed state of the fuel tank mounting structure (a resin fuel tank) according to the first embodiment of the invention when positive pressure is applied.

Meanwhile, as shown in FIG. 3, in the fuel tank 12 according to the embodiment, deformation of the high-rigidity portions 22A, 22B is restrained as the high-rigidity portions 22A, 22B have higher rigidity than that of the horizontal portion 18A and so on. The high-rigidity portions 22A, 22B, in particular, have even higher rigidity because the high-rigidity portions 22A, 22B are supported by the tank bands 32A, 32B arranged in the recessed grooves 20A, 20B. As a result, the location and position of the built-in part 24, both ends of which are fixed by the high-rigidity portions 22A, 22B, hardly change inside the fuel tank 12 when the fuel tank 12 is deformed. Further, the built-in part 24 is fixed at one point in the horizontal portion 18A of the fuel tank 12. In other words, the horizontal portion 18A between the tank bands 32A, 32B, which changes most, is fixed at one point to the built-in part 24. Therefore, as shown in FIG. 3, deformation of the bottom wall 14A (the horizontal portion 18A) of the fuel tank 12 is restrained (an amplitude (a deformation amount) in the comparative example (see FIG. 2) is reduced by half).

Explained next is a case where negative pressure is applied to the fuel tank 12 due to a decrease in outdoor air temperature and so on.

Figure 4:
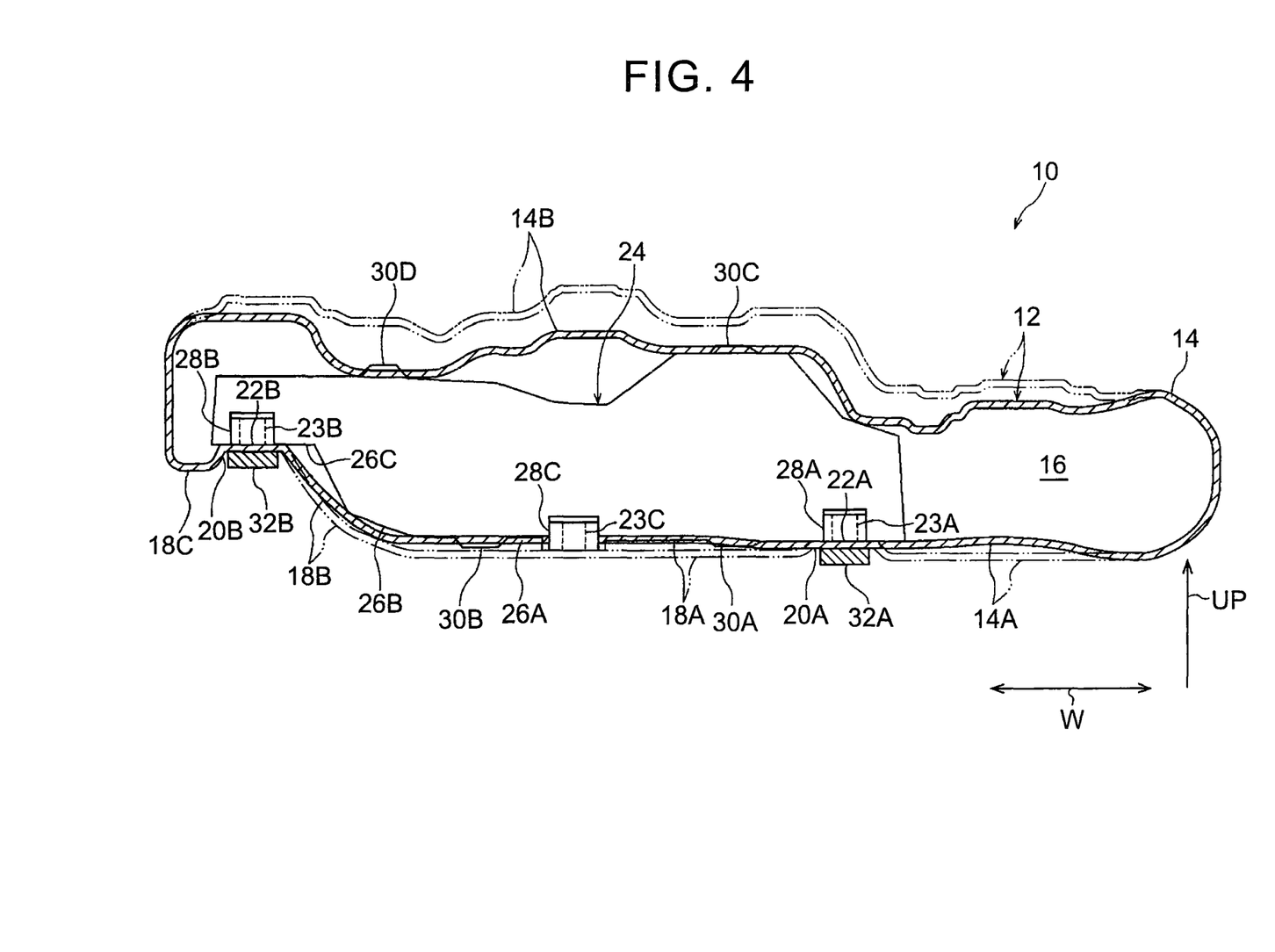
FIG. 4 is a vertical sectional view showing a deformed state of the fuel tank mounting structure (the resin fuel tank) according to the comparative example when negative pressure is applied.

In order to explain effects of the embodiment, deformation of a fuel tank 12 without the support portions 30A to 30D is shown in FIG. 4 as a comparative example.

When negative pressure is applied to the fuel tank 12, the fuel tank 12 shrinks. In particular, an upper wall 14B of the fuel tank 12 is largely deformed to a lower side in the vehicle up and down direction.

Figure 5:
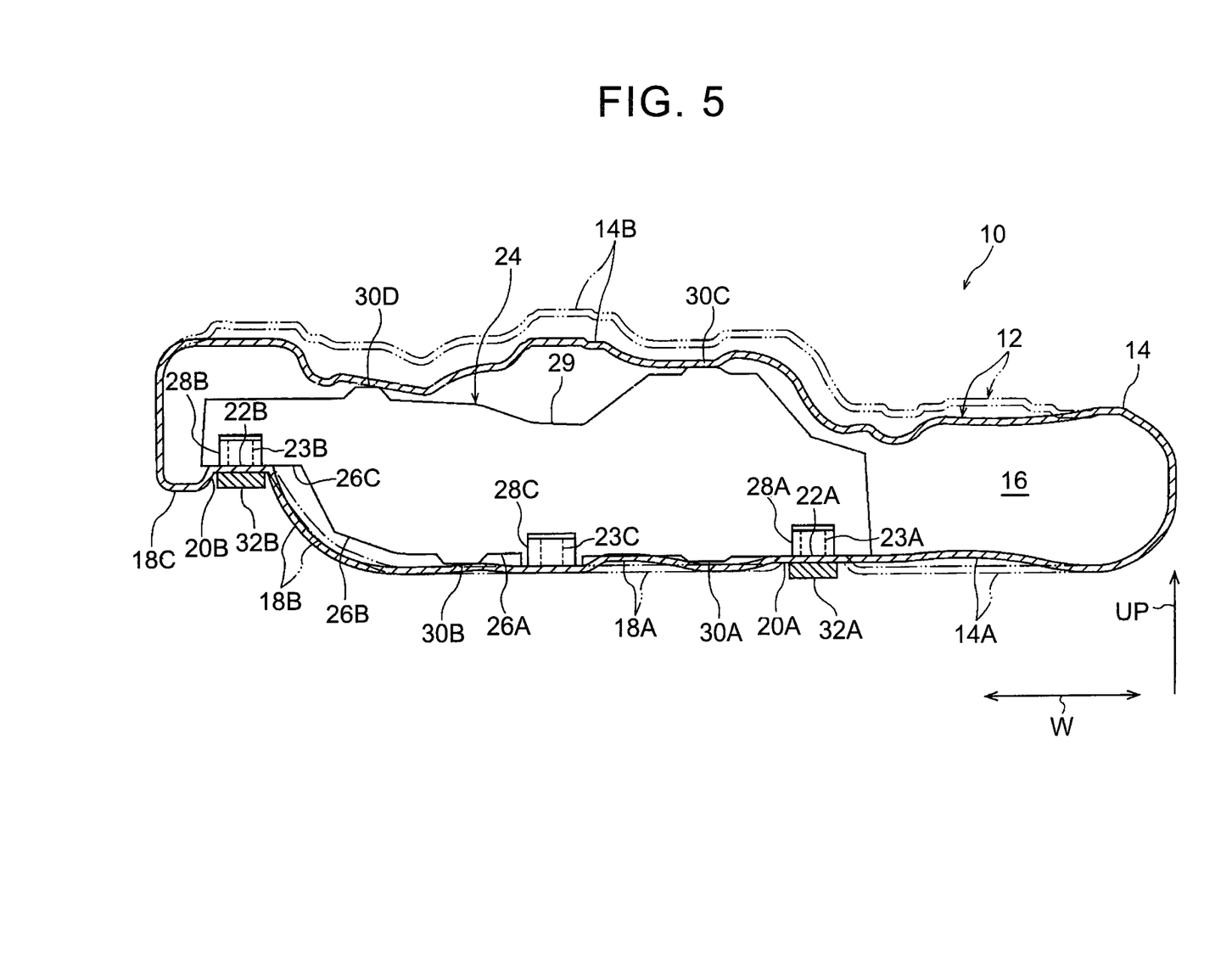
FIG. 5 is a vertical sectional view showing a deformed state of the fuel tank mounting structure (the resin fuel tank) according to the first embodiment of the invention when negative pressure is applied.

Meanwhile, in the fuel tank 12 and the fuel tank mounting structure 10 according to the embodiment, the high-rigidity portions 22A, 22B having higher rigidity than that of the flat surface portion such as the horizontal portion 18A are hardly deformed similarly to the case where positive pressure is applied. As a result, location and position of the built-in part 24, both ends of which are fixed by the high-rigidity portions 22A, 22B, are restrained from changing inside the fuel tank 12. Therefore, as shown in FIG. 5, the support portions 30C, 30D, which are formed in the upper portion 29 of the built-in part 24, support the upper wall 14B of the fuel tank 12 deformed to the inner side, and restrain the deformation of the upper wall 14B of the fuel tank 12. Similarly, the support portions 30A, 30B, which are formed in the bottom portion 26 of the built-in part 24, support the bottom wall 14A of the fuel tank 12 deformed to the inner side, and restrain the deformation of the bottom wall 14A of the fuel tank 12.

As stated so far, in the fuel tank 12 and the mounting structure 10 of the fuel tank 12 according to the embodiment, the built-in part 24 housed inside the fuel tank 12 is fixed to the high-rigidity portions 22A, 22B of the fuel tank 12 and to the horizontal portion 18A, thereby restraining deformation of the fuel tank 12. In short, by fixing the built-in part 24 to the high-rigidity portions 22A, 22B that are restrained from being deformed when the fuel tank 12 is deformed, deformation of the horizontal portion 18A fixed at one point to the built-in part 24 is restrained.

Because the built-in part 24 is used in order to restrain deformation of the fuel tank 12, it is not necessary to provide a new member to restrain deformation of the fuel tank 12. Therefore, a weight of a vehicle is not increased.

Further, the built-in part 24 is used in order to restrain deformation of the fuel tank 12. Therefore, unlike the case where an outer side of the fuel tank 12 is reinforced, an installation space for the fuel tank 12 is not increased and a degree of freedom in designing a vehicle is not reduced.

Further, since the high-rigidity portions 22A, 22B are located at positions where the tank bands 32A, 32B are arranged (the recessed grooves 20A, 20B), rigidity becomes even higher by arranging the tank bands 32A, 32B, and deformation is prevented. As a result, changes in location and position of the built-in part 24 arranged inside the fuel tank 12 are restrained even further when the fuel tank 12 is deformed, thereby restraining deformation of the fuel tank 12 (the horizontal portion 18A) even more.

Furthermore, in the bottom wall 14A, portions where the recessed grooves 20A, 20B for the tank bands 32A, 32B are defined are used as the high-rigidity portions 22A, 22B for fixing the built-in part 24. Therefore, it is not necessary to form new high-rigidity portion for fixing the built-in part 24.

In the fuel tank 12, the built-in part 24 is fixed to the horizontal portion 18A of the bottom wall 14A. Therefore, it is possible to restrain deformation of the bottom wall 14A that is deformed most when positive pressure is applied due to a weight of fuel (see FIG. 2, and FIG. 3). In particular, since the built-in part 24 is fixed to the horizontal portion 18A of the fuel tank 12 at a position between the high-rigidity portions 22A, 22B, it is possible to reduce an amplitude between the high-rigidity portions by half

[Second Embodiment] Next, a resin fuel tank and a mounting structure of the resin fuel tank according to a second embodiment are explained. Constituents similar to those of the resin fuel tank and the mounting structure of the resin fuel tank according to the first embodiment are denoted by the same reference numerals, and the detailed explanation is omitted. Differences from the first embodiment are only the shape and fixed position of the built-in part fixed inside the fuel tank, and only these differences are explained.

Figure 6:
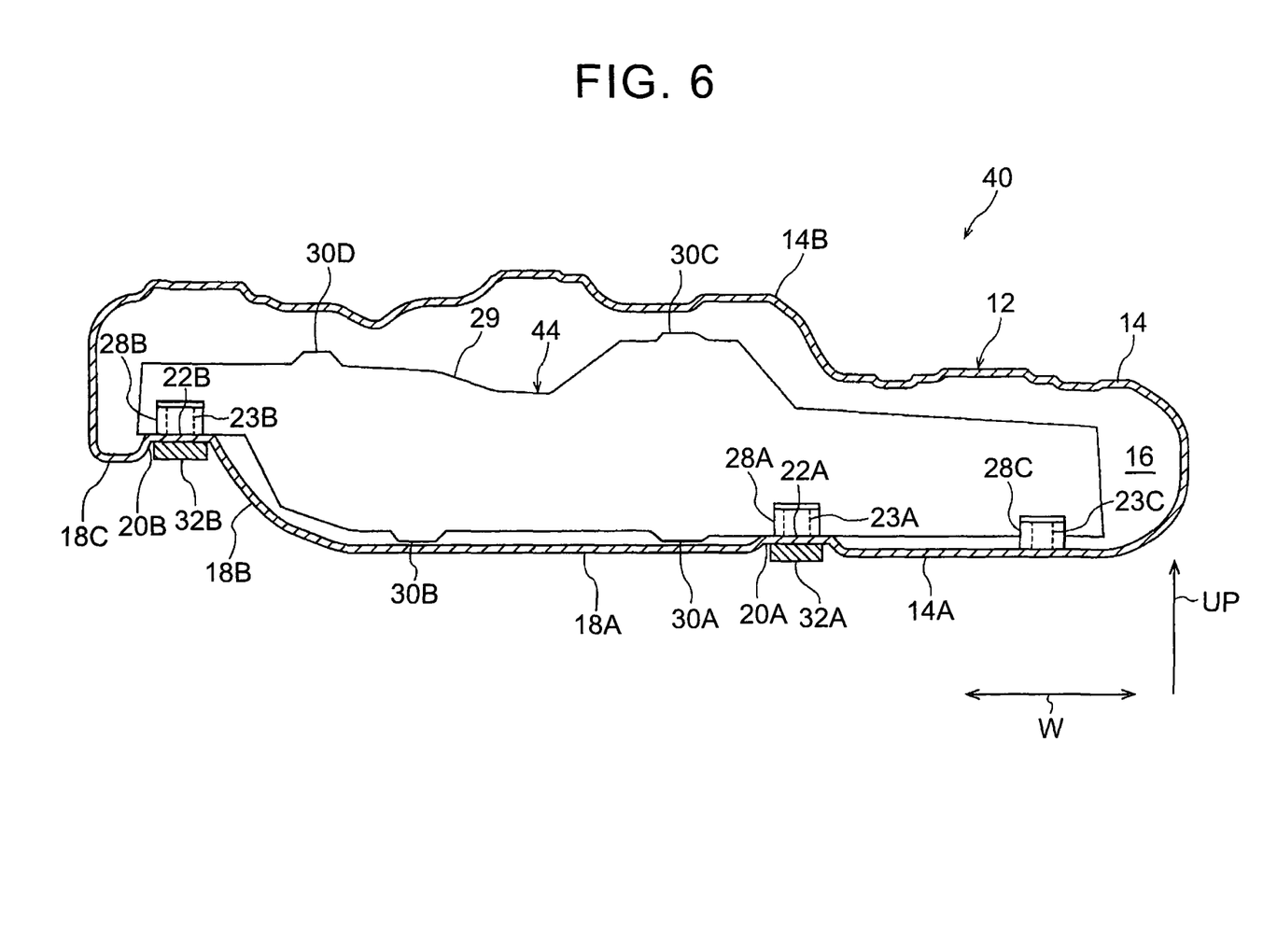
FIG. 6 is a vertical sectional view showing a fuel tank mounting structure according to a second embodiment of the invention.

FIG. 6 shows a vertical sectional view of a fuel tank mounting structure 40. A built-in part 44 built in a resin fuel tank 12 is formed to be longer in the vehicle width direction than the built-in part 24 according to the first embodiment. It is the same as the first embodiment that the built-in part 44 is fixed to high-rigidity portions 22A, 22B on tank bands 32A, 32B. However, the built-in part 44 is fixed to a horizontal portion 18A on the right side of the high-rigidity portion 22A in FIG. 6, in other words, outside a location, the location being between the high-rigidity portions 22A, 22B.

Effects of the resin fuel tank 12 and the fuel tank mounting structure 40 structured as above are explained.

The built-in part 44 is fixed to the high-rigidity portions 22A, 22B. Therefore; changes in location and position of the built-in part 44 inside the resin fuel tank 52 are restrained even when expansion deformation of the resin fuel tank 12 happens. The built-in part 24 is also fixed to the horizontal portion 18A of the fuel tank 12 outside a location, the location being between the high-rigidity portions 22A, 22B. Therefore, deformation of the bottom wall 14A (the horizontal portion 18A) of the fuel tank 12 is restrained to a maximum amplitude between the high-rigidity portions 22A, 22B or smaller.

[Third Embodiment] A fuel tank and a fuel tank mounting structure according to a third embodiment of the invention are explained. Constituents similar to those of the resin fuel tank and the fuel tank mounting structure according to the first embodiment are denoted by the same reference numerals, and the detailed explanation is omitted.

Figure 7:
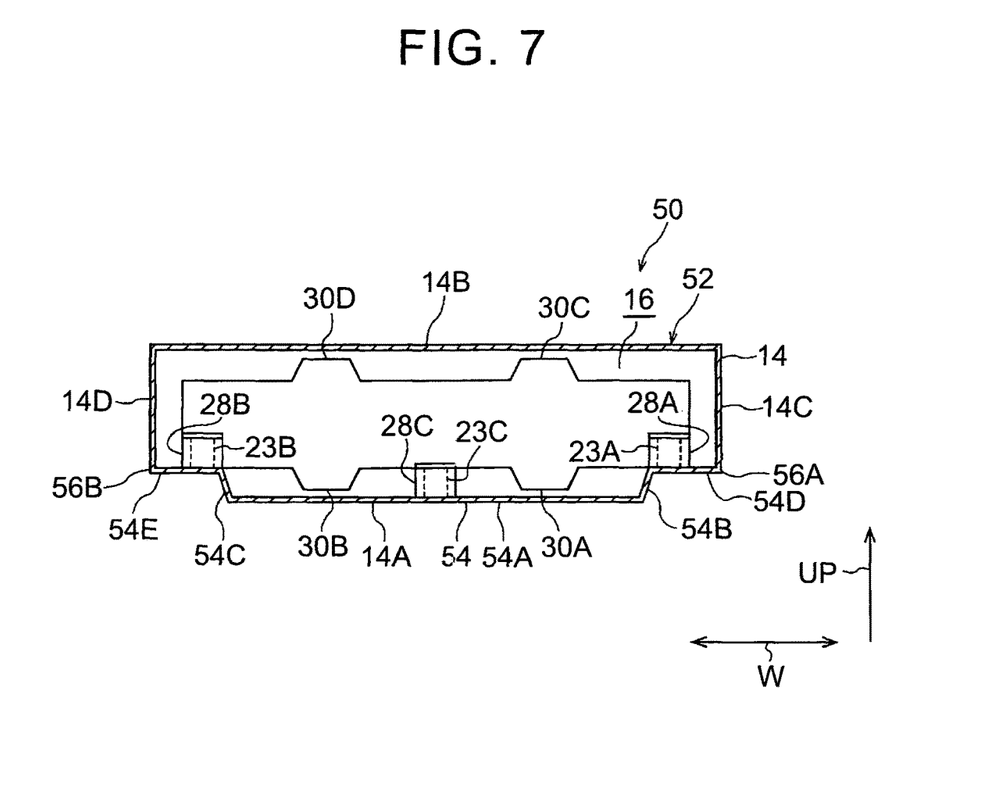
FIG. 7 is a vertical sectional view showing a fuel tank mounting structure according to a third embodiment of the invention.

FIG. 7 shows a vertical sectional view of a fuel tank mounting structure 50. FIG. 7 is a schematically illustrated in order to simplify explanation.

As shown in FIG. 7, the resin fuel tank 52 according to the embodiment has a generally rectangular shape. A center portion of a bottom wall 54 in the vehicle width direction W is a horizontal portion 54A, which is a flat surface portion located at a lower position. Inclined portions 54B, 54C, which are flat surface portions inclined to an upper side in the vehicle up and down direction, are formed at both ends of the horizontal portion 54A, and horizontal portions 54D, 54E further extending in the vehicle width direction W from end portions of the inclined portions 54B, 54C are formed. A built-in part 24 is fixed to corner portions 56A, 56B, which are made by the horizontal portions 54D, 54E are a part of the bottom wall 14A of the resin fuel tank 52, and side walls 14C, 14D. The "corner portion" herein includes a boundary made by two flat surface portions, is a portion with rigidity that does not allow deformation when the fuel tank 52 is deformed, and corresponds to a high-rigidity portion of the invention.

The built-in part 24 is formed with a length so that both end parts of the built-in part 24 reach the corner portions 56A, 56B, respectively. The built-in part 24 is fixed to the corner portions (the high-rigidity portions) 56A, 56B and the horizontal portion 54A by inserting fitted members 23A to 23C of the resin fuel tank 52 into the swaging portions 28A~28C and performing swaging.

Effects of the resin fuel tank 52 and the fuel tank mounting structure 50 structured as stated above are explained.

The resin fuel tank 52 is fixed to the corner portions 56A, 56B made by the bottom wall 14A (the horizontal portions 54D, 54E) and the side walls 14C, 14D of the resin fuel tank 52 as stated in this embodiment. The built-in part 24 fixed to the corner portions 56A, 56B is not deformed when the fuel tank 12 is deformed, thereby maintaining the location and position of the built-in part 24 inside the fuel tank. Therefore, by fixing the built-in part 24 at one point of the horizontal portion 54A of the resin fuel tank 52, it is possible to restrain deformation of the horizontal portion 54A having a large deformation amount.

As stated above, in the resin fuel tank 52 according to this embodiment, the built-in part 24 is fixed to the corner portions 56A, 56B made by the bottom wall 14A and the side walls 14C, 14D. Therefore, even if there is no high-rigidity portion formed in the bottom wall 14A (the horizontal portions 54D, 54E) to protrude to an inner side, it is possible to restrain deformation of the horizontal portion 18A when the resin fuel tank 52 is deformed.

[Fourth Embodiment] Further, a resin fuel tank and a mounting structure of the resin fuel tank according to a fourth embodiment of the invention are explained. Constituents similar to those of the resin fuel tank and the mounting structure of the resin fuel tank according to the third embodiment are denoted by the same reference numerals, and the detailed explanation is omitted.

Figure 8:
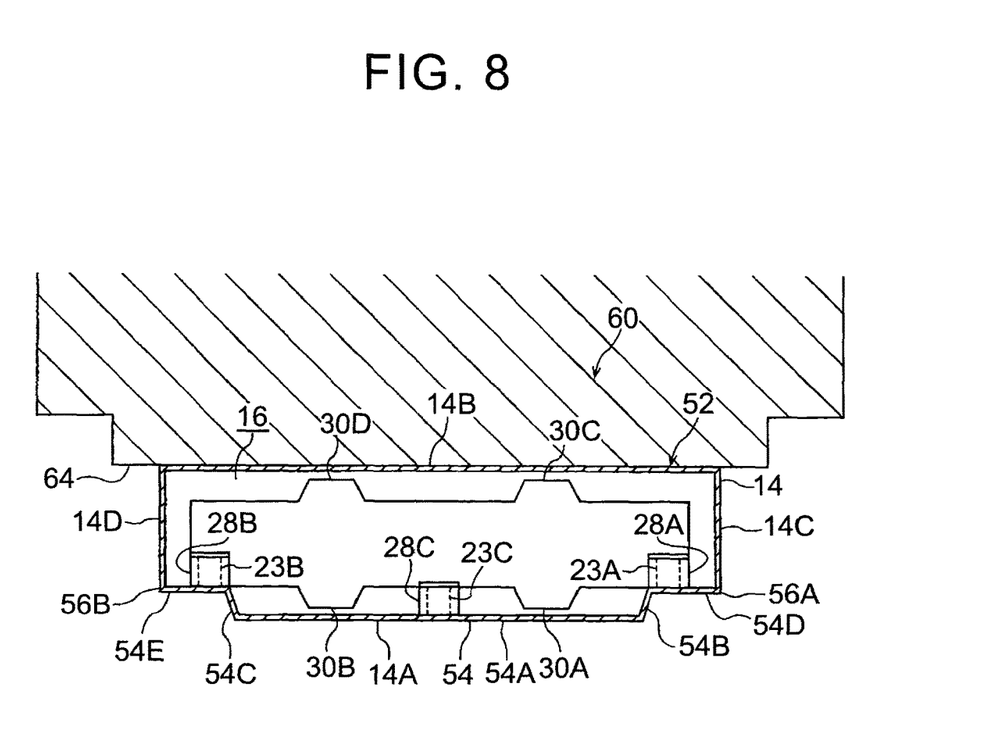
FIG. 8 is a vertical sectional view showing a fuel tank mounting structure according to a fourth embodiment of the invention.

FIG. 8 shows a vertical sectional view of a fuel tank mounting structure 60. As shown in FIG. 8, in a resin fuel tank 52 according to this embodiment, an upper wall 14B is abutted on a member 64 in a lower part of a vehicle in a state where the resin fuel tank 52 is mounted on the vehicle.

Therefore, when the resin fuel tank 52 is having expansion deformation due to an increase in outdoor air temperature and so on, deformation of the upper wall 14B is restricted by the member 64 in the lower part of the vehicle.

In other words, in the fuel tank mounting structure 60, deformation of a bottom wall 14A of the resin fuel tank 52 is restrained by fixing a built-in part 24 to a horizontal portion 54A, and deformation of the upper wall 14B is restrained by the member 64 in the lower part of the vehicle. Therefore, it is possible to restrain deformation of the resin fuel tank 52 even further.

In this embodiment, the member 64 in the lower part of the vehicle abuts on the upper wall 14B of the resin fuel tank 52, but may also be arranged in proximity to the upper wall 14B. Here, "proximity arrangement" means that the upper wall 14B and the member 64 are arranged in a distance within a range where the upper wall 14B of the resin fuel tank 52 abuts on the member .64 while the upper wall 14B is being deformed.

In this case, the upper wall 14B of the resin fuel tank 52 has expansion deformation due to positive pressure and abuts on the member 64 of the vehicle. Thus, further deformation of the upper wall 14B is restrained.

[Fifth Embodiment] A resin fuel tank and a mounting structure of the resin fuel tank according to a fifth embodiment of the invention are explained. Constituents similar to those of the resin fuel tank and the mounting structure of the resin fuel tank according to the first embodiment are denoted by the same reference numerals, and the detailed explanation is omitted.

Figure 9:
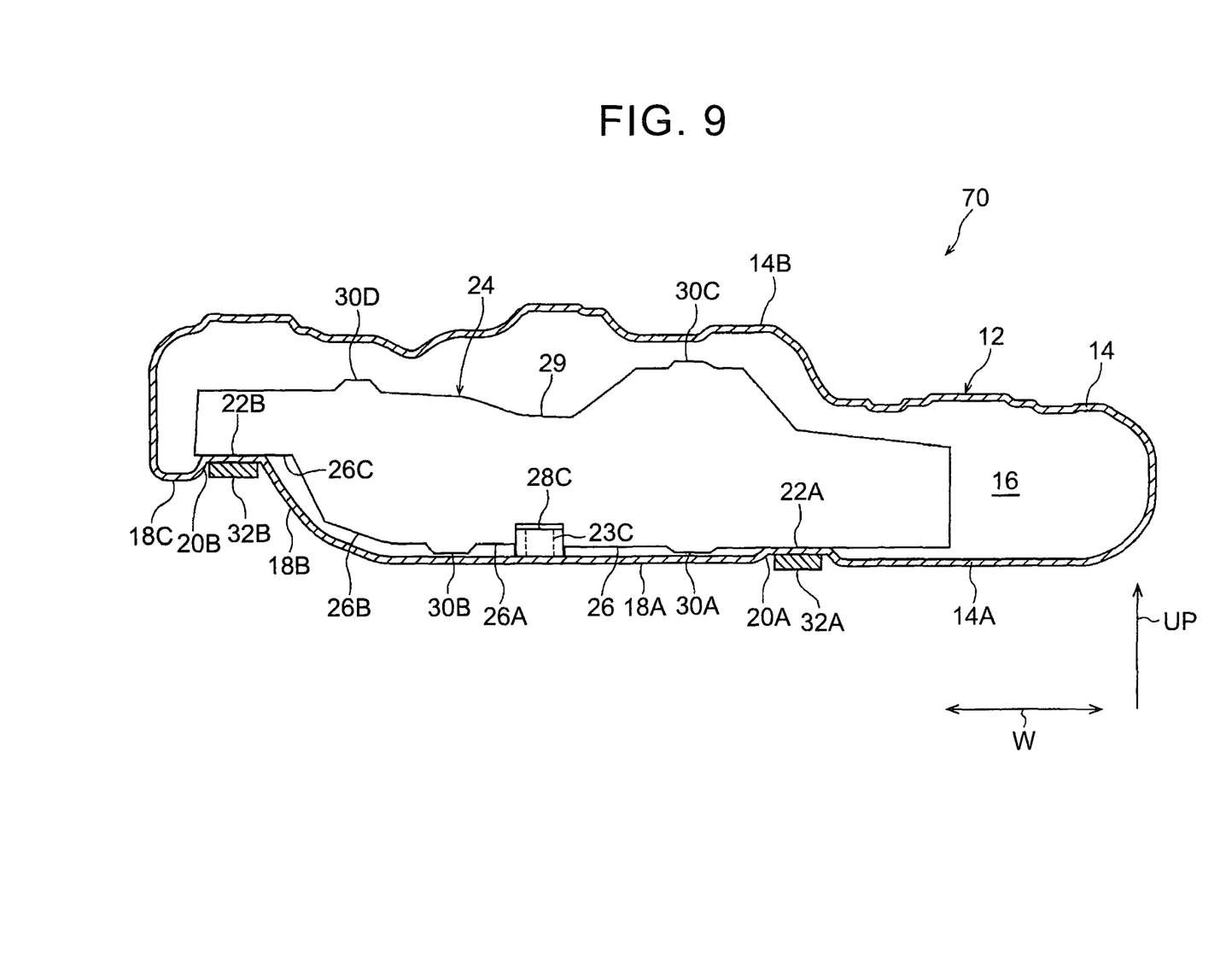
FIG. 9 is a vertical sectional view showing a fuel tank mounting structure according to a fifth embodiment of the invention.

FIG. 9 shows a fuel tank mounting structure 70. In the fuel tank mounting structure 10 according to the first embodiment, the built-in part 24 is fixed to the high-rigidity portions. 22A, 22B by swaging. The only difference in the fuel tank mounting structure 70 is that the built-in part 24 is placed on high-rigidity portions 22A, 22B.

In the fuel tank mounting structure 70, the built-in part 24 is simply placed on the high-rigidity portions 22A, 22B. However, since deformation of the high-rigidity portions 22A, 22B is restrained when a fuel tank 12 is deformed, changes in location, and position of the built-in part 24 supported by the high-rigidity portions 22A, 22B are restrained. Therefore, by fixing the built-in part 24 at one point of a horizontal portion 18A of the fuel tank 12, it is possible to restrain deformation of the horizontal portion 18A that has a large deformation amount when the fuel tank is deformed.

In particular, in this embodiment, since the built-in part 24 is simply placed on the high-rigidity portions 22A, 22B, there is an advantage that it is not necessary to fix the built-in part 24 to the high-rigidity portions 22A, 22B by swaging.

Figure 10:
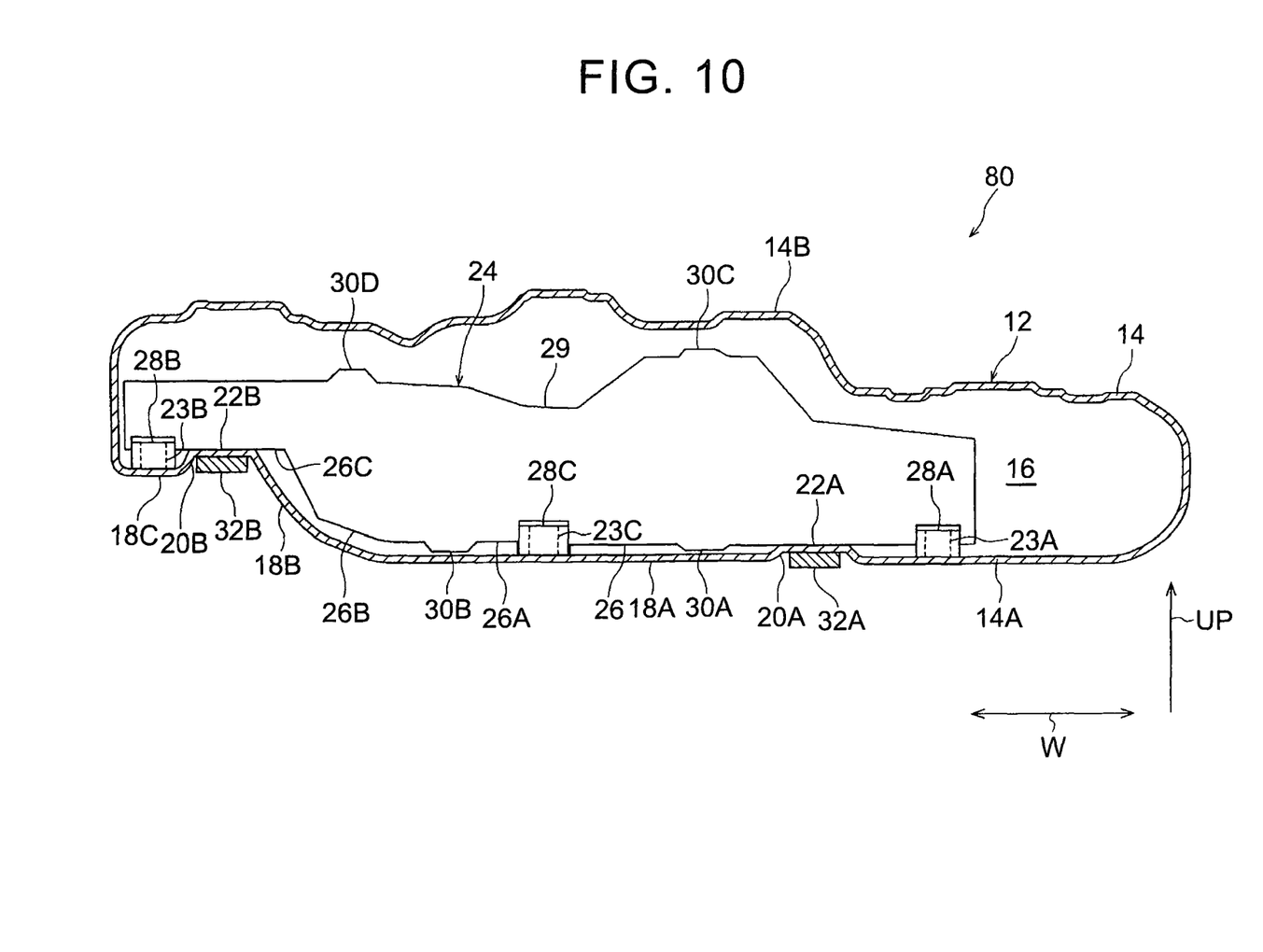
FIG. 10 is a vertical sectional view showing a fuel tank mounting structure according to another example of the fifth embodiment of the invention.

Further, as shown in FIG. 10, a fuel tank mounting structure 80 is possible. In other words, a built-in part 24 is placed on high-rigidity portions 22A, 22B, and fitted members 23A, 23B provided in horizontal portions 18A, 18C on an outer side of a location, the location being between the high-rigidity portions 22A, 22B, are inserted in swaging portions 28A, 28B of the built-in part 24 and swaging is performed. Thus, both ends of the built-in part 24 are fixed to a bottom wall 14A of a fuel tank 12.

In this case, since the built-in part 24 is supported by the high-rigidity portions 22A, 22B, changes in location and position of the built-in part 24 are also restrained when the fuel tank is deformed, and deformation of the horizontal portion 18A of the fuel tank 12 fixed to the built-in part 24 is restrained.

In the series of embodiments, examples are explained in which the built-in part 24 is abutted (including both fixed or placed) on the two high-rigidity portions, and is fixed at one point in the horizontal portion that is the flat surface portion. However, it is only necessary that the built-in part 24 is abutted on at least two high-rigidity portions and is fixed to at least one point of the flat surface portion, as long as deformation of the fuel tank is restrained.

As long as the built-in part 24 is abutted on at least two high-rigidity portions and is fixed to at least one point of the flat surface portion, the built-in part 24 having any other function corresponds to a built-in part according to the invention.

In the series of embodiments, the resin fuel tank is explained. However, the invention is applicable to any fuel tank made of a material that is deformed due to outdoor air temperature and so on.

In the series of embodiments, the built-in part 24 is fixed to the bottom wall 14A of the resin fuel tank, but may also be fixed to other locations. For example, the built-in part 24 may be fixed to the upper wall 14B of the fuel tank.

Furthermore, in the series of embodiment, swaging is performed to fix the built-in part 24 to the fuel tank, but other methods may be used to fix the built-in part 24.

Yet further, in the series of the embodiments, the fuel tank is held on a vehicle with the tank bands, but other members may be used to fix the fuel tank to the vehicle.

The invention claimed is:

1. A fuel tank mounting structure and a fuel tank to be mounted on a vehicle by the fuel tank mounting structure, the fuel tank comprising:
    a wall portion defining a closed space in which fuel is housed, the wall portion including a bottom wall which is part of a bottom surface of the fuel tank, the bottom wall including at least two high rigidity portions and a flat surface portion, a fitted member for fixing a built-in part being provided on at least one location on the flat surface portion in the bottom wall;
    each high-rigidity portion being formed to protrude to an inner side or an outer side of the closed space from the flat surface portion; and
    the built-in part being housed in the closed space, the built-in part being fixed to each of the at least two of the high-rigidity portions by swaging, wherein the built-in part is fixed by said fitted member at said at least one location on the flat surface portion, and
    each of the at least two high-rigidity portions is a portion that has a higher rigidity than that of the flat surface portion,
    the fuel tank mounting structure comprising:
    a holding portion configured to hold the fuel tank at a position of the at least two high-rigidity portions of the fuel tank and the holding portion configured to mount the fuel tank to a vehicle body, wherein
    the holding portion is a tank band holding the fuel tank, and
    the at least two high-rigidity portions are recessed grooves being defined to protrude from the flat surface portion to the inner side, the tank band being arranged in the recessed grooves.

2. The fuel tank mounting structure and fuel tank according to claim 1, wherein
    the at least two high-rigidity portions are formed to protrude to the inner side of the closed space from the flat surface portion.

3. The fuel tank mounting structure and fuel tank according to claim 1, wherein
    the at least two high-rigidity portions are provided in a bottom wall on a lower side of the fuel tank in a vehicle up and down direction.

4. The fuel tank mounting structure and fuel tank according to claim 1, wherein
    each of the at least two high rigidity portions is a corner portion made by a plurality of additional flat surface portions, and
    the built-in part is fixed by said fitted member at said at least one location on the flat surface portion on the bottom wall between the corner portions.

5. The fuel tank mounting structure and fuel tank according to claim 1, wherein
    the built-in part is fixed to the flat surface portion at at least one point on an outer side of a location, the location being between the high-rigidity portions.

6. The fuel tank mounting structure and fuel tank according to claim 1, wherein
    the fuel tank is arranged to be mounted on a vehicle with an upper wall of the fuel tank on an upper side in the vehicle up and down direction to be abutted on or arranged in proximity to another member of the vehicle.

* * * * *